US012659418B2

(12) United States Patent
    Segal

(10) Patent No.: US 12,659,418 B2
(45) Date of Patent: Jun. 16, 2026

(54) SYSTEM AND METHOD FOR MULTI-MODAL DETECTION OF COVERT COGNITIVE ENTRAINMENT SIGNALS IN DIGITAL MEDIA

(71) Applicant: Randy Segal, Key Largo, FL (US)

(72) Inventor: Randy Segal, Key Largo, FL (US)

( * ) Notice: Subject to any disclaimer, the term of this patent is extended or adjusted under 35 U.S.C. 154(b) by 0 days.

(21) Appl. No.: 19/422,049

(22) Filed: Dec. 16, 2025

(65) Prior Publication Data

US 2026/0106947 A1      Apr. 16, 2026

Related U.S. Application Data

(60) Provisional application No. 63/935,600, filed on Dec. 10, 2025.

(51) Int. Cl.
    *H04N 5/06*       (2006.01)
    *G06F 21/60*      (2013.01)
    *H04N 21/431*     (2011.01)
(52) U.S. Cl.
    CPC ............. *H04N 5/06* (2013.01); *G06F 21/604* (2013.01); *H04N 21/431* (2013.01)
(58) Field of Classification Search
    CPC ....... H04N 5/06; H04N 21/431; G06F 21/604
    See application file for complete search history.

(56) References Cited

U.S. PATENT DOCUMENTS

2025/0117870 A1 *   4/2025   Sanchez ................. G10L 25/30

* cited by examiner

*Primary Examiner* — Yassin Alata

(57) ABSTRACT

A multi-modal system for real-time detection of covert cognitive entrainment signals in digital media is disclosed. The system includes an Audio Analysis Engine that processes audio streams through signal acquisition, pre-processing, frequency domain analysis, feature extraction, and threat scoring to detect binaural beats and isochronic tones. A Visual Analysis Engine processes video frames via platform-compliant acquisition, performing luminance FFT and regional flicker detection to identify photic driving stimuli. An Electromagnetic Analysis Engine monitors EM signatures. A Multi-Modal Threat Consolidation Engine synchronizes timestamps and frequency data across all engines, applying a synchronization weighting factor when audio and visual frequency signatures match within 0.5 Hz. This cross-modal correlation dramatically increases threat scores for coordinated attacks. The system classifies detected signals into five threat levels (None, Low, Medium, High, Critical) based on frequency difference, channel coherence, signal duration, and synchronization factor, providing actionable protection while operating within platform security constraints.

10 Claims, 6 Drawing Sheets

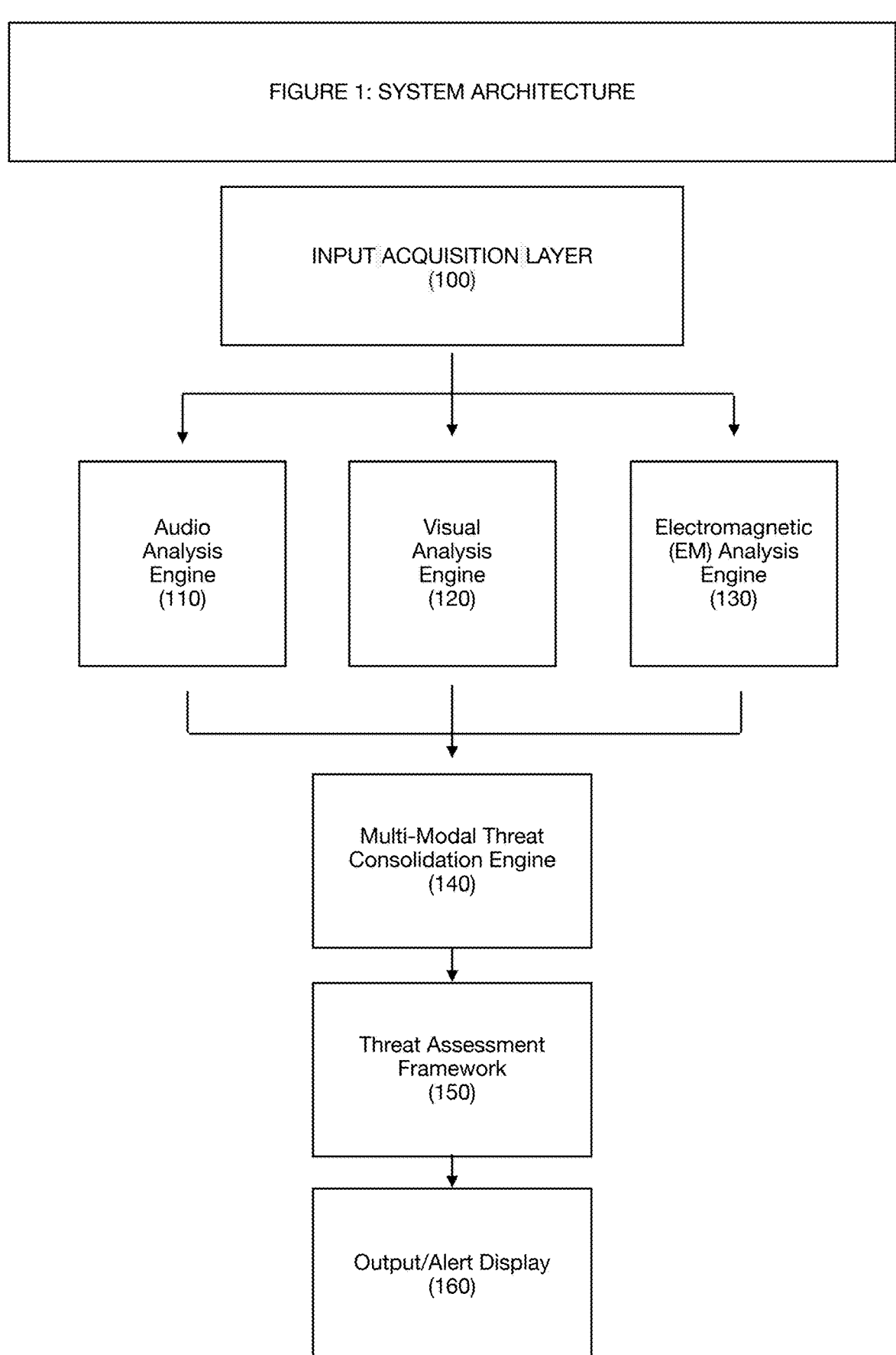
FIGURE 1: SYSTEM ARCHITECTURE

FIGURE 2: AUDIO ANALYSIS FLOWCHART
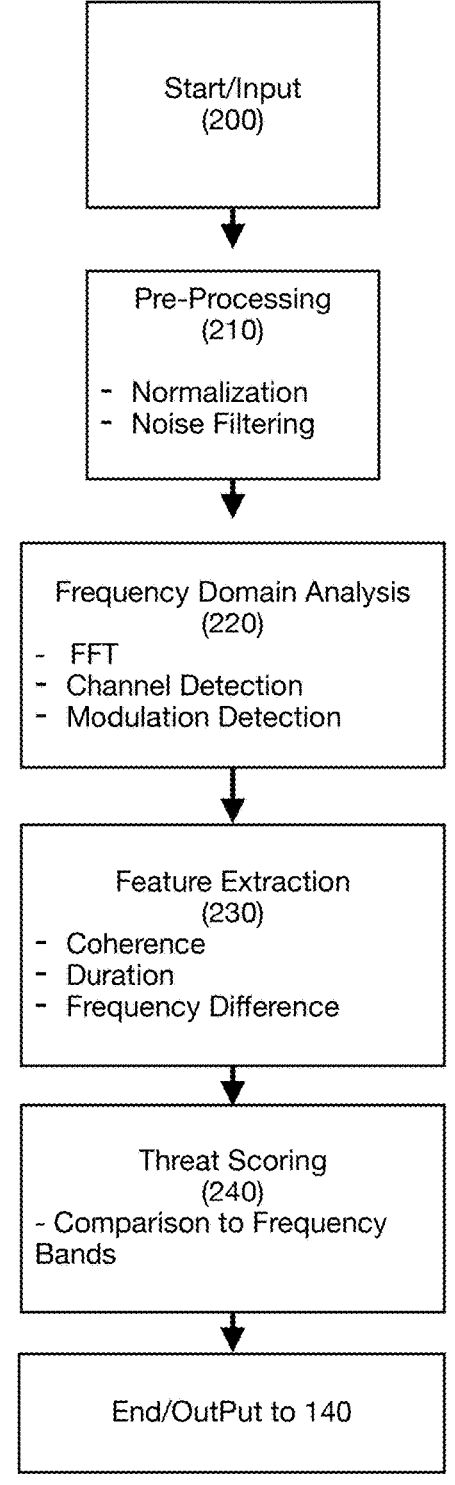

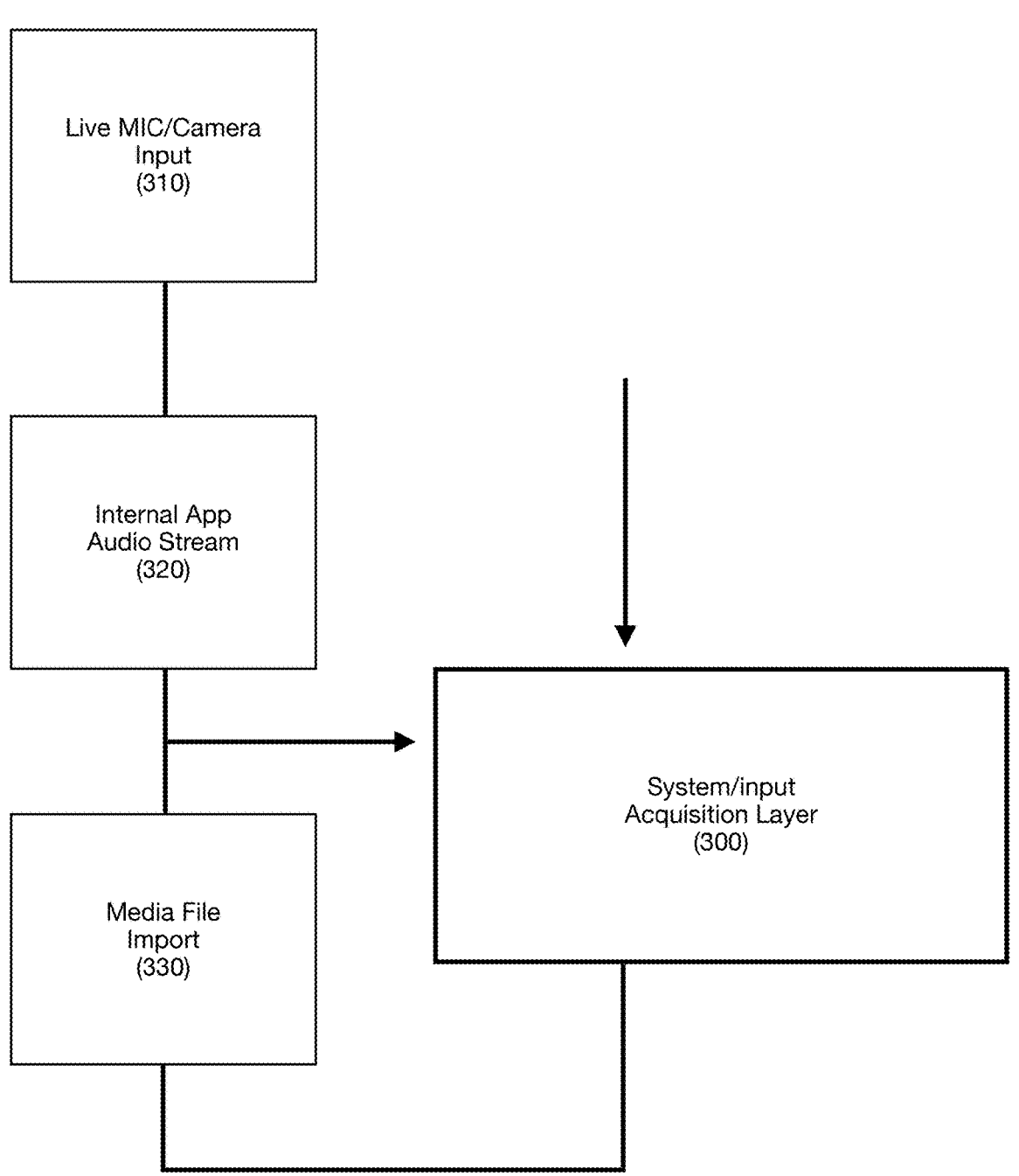
FIGURE 3: MULTI-MODE MONITORING DIAGRAM
Live MIC/Camera Input (310)
Internal App Audio Stream (320)
Media File Import (330)
System/input Acquisition Layer (300)

FIGURE 4: THREAT ASSESSMENT FRAMEWORK VISUALIZATION
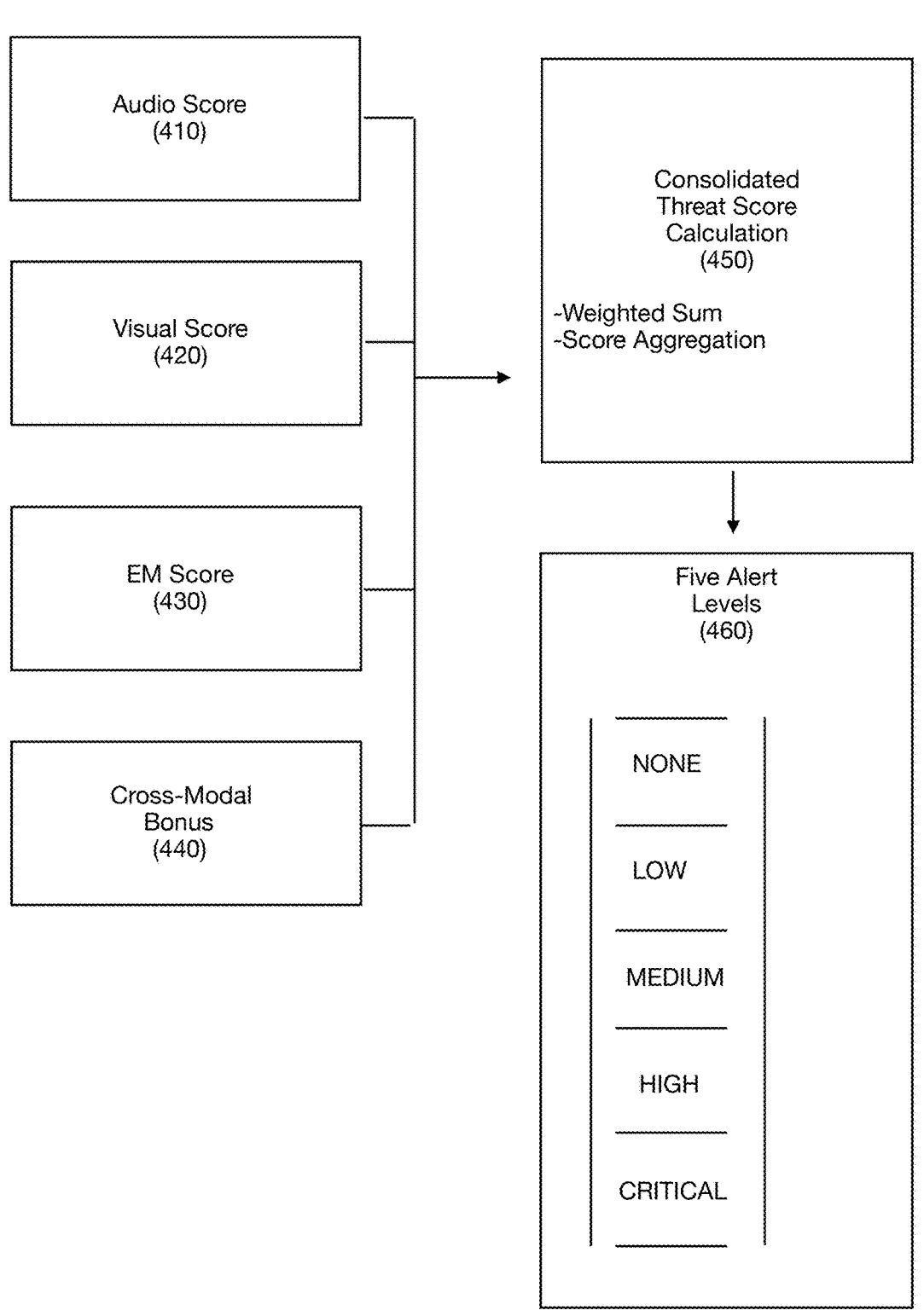

Figure 5:
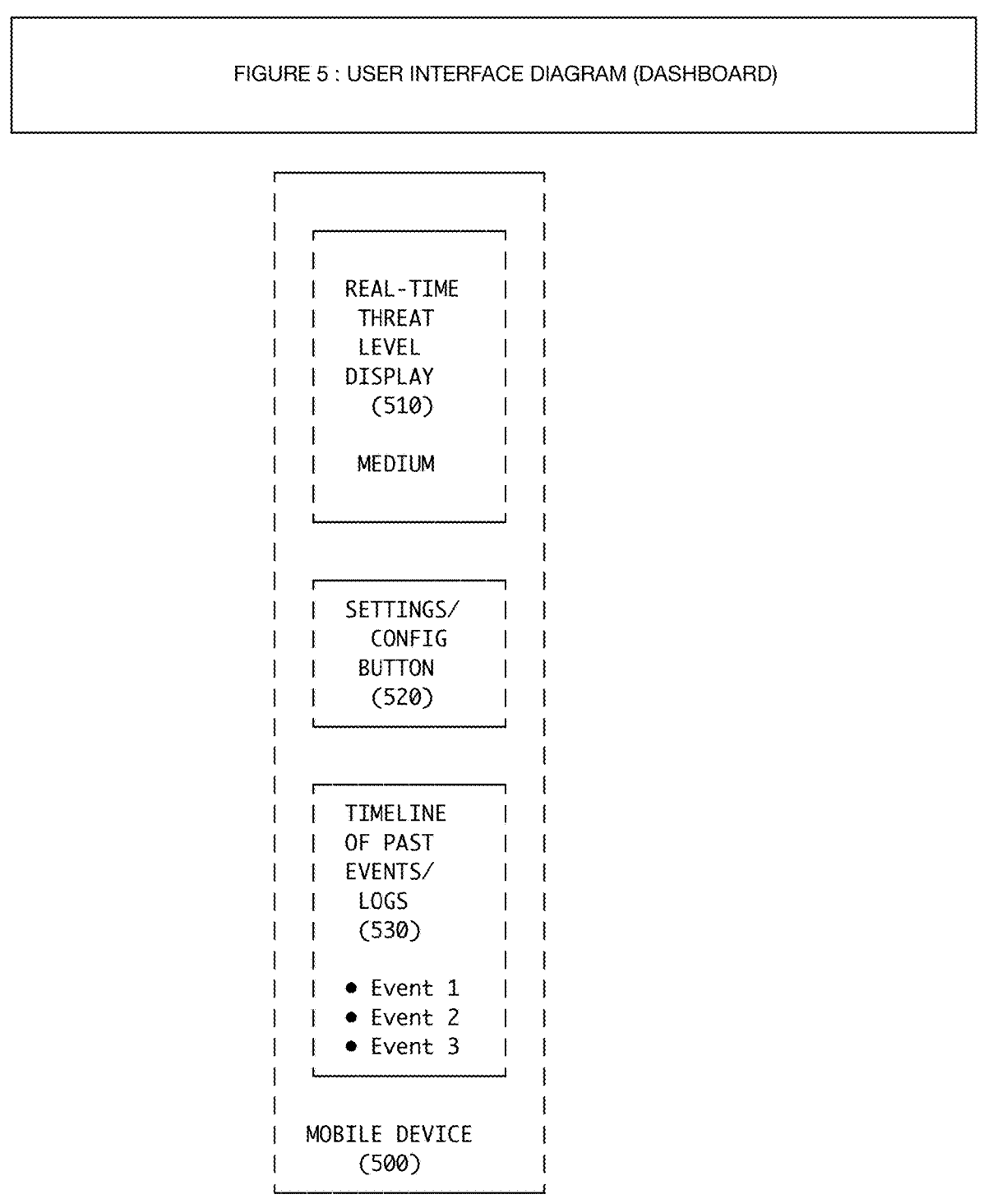

FIGURE 5 : USER INTERFACE DIAGRAM (DASHBOARD)

```
REAL-TIME
 THREAT
 LEVEL
DISPLAY
 (510)

MEDIUM

SETTINGS/
 CONFIG
 BUTTON
 (520)

TIMELINE
OF PAST
EVENTS/
 LOGS
 (530)

• Event 1
 • Event 2
 • Event 3

MOBILE DEVICE
    (500)
```

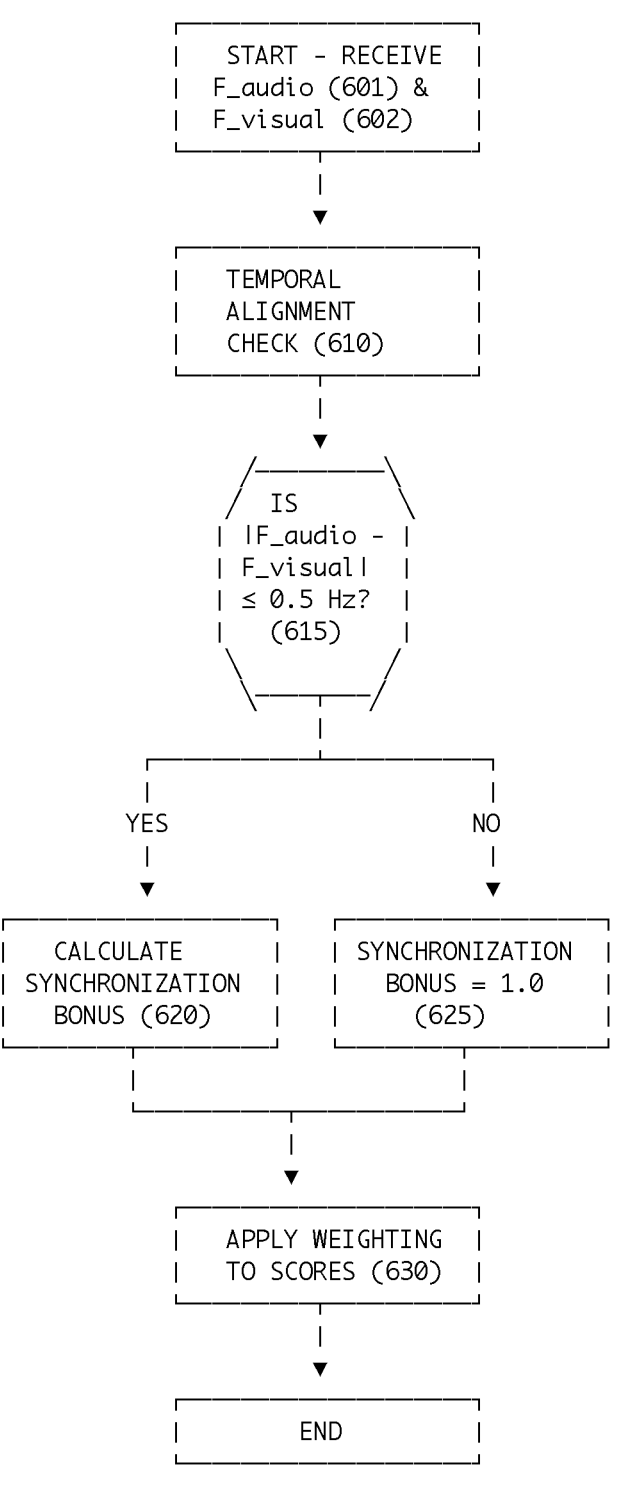
FIGURE 6 : CROSS-CORRELATION FLOW CHART
START - RECEIVE F_audio (601) & F_visual (602)
TEMPORAL ALIGNMENT CHECK (610)
IS |F_audio - F_visual| ≤ 0.5 Hz? (615)
YES
NO
CALCULATE SYNCHRONIZATION BONUS (620)
SYNCHRONIZATION BONUS = 1.0 (625)
APPLY WEIGHTING TO SCORES (630)
END

SYSTEM AND METHOD FOR MULTI-MODAL DETECTION OF COVERT COGNITIVE ENTRAINMENT SIGNALS IN DIGITAL MEDIA

CROSS-REFERENCE TO RELATED APPLICATIONS

This application claims the benefit of U.S. Provisional Patent Application No. 63/935,600, filed Dec. 10, 2025, entitled "Complete Provisional Patent Application: Brain-Guard Pro," which is hereby incorporated by reference in its entirety.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING APPENDIX

Not applicable.

BACKGROUND OF THE INVENTION

Field of the Invention

The present invention relates to electronic security, defensive computer vision, real-time signal processing, and cognitive defense systems. Specifically, it relates to a multimodal system that detects covert cognitive entrainment signals-including auditory binaural/isochronic tones, visual photic driving stimuli, and electromagnetic signatures-embedded within digital media content across mobile, desktop, and ambient environments.

Description of the Related Art

Digital media consumption has become ubiquitous across all demographics, with users spending increasing amounts of time interacting with content delivered through smartphones, tablets, computers, and other connected devices. Within this landscape, certain audio and visual patterns can be embedded in media content to influence cognitive states through brainwave entrainment techniques such as isochronic tones, binaural beats, and frequency-following responses.

Prior art systems for detecting such phenomena have been limited to specialized laboratory equipment or isolated analysis tools that cannot be deployed across the wide variety of consumer devices and platforms. These systems typically require dedicated hardware, are not designed for real-time monitoring, and cannot operate within the security constraints of consumer operating systems. Additionally, existing solutions fail to address the need for user-configurable monitoring that respects privacy boundaries while providing meaningful protection.

The technical challenges of implementing such detection on consumer devices include: Operating within platform security constraints (sandboxing); Processing media streams without violating privacy policies; Maintaining system performance while conducting complex signal analysis; Differentiating between therapeutic and potentially manipulative signals; Providing actionable information to users without causing unnecessary alarm.

Current consumer operating systems lack built-in protection against these covert signals, leaving users vulnerable to potential manipulation through everyday media consumption without their knowledge or consent.

Scientific validation of brainwave entrainment effects is well-documented in peer-reviewed literature, including Varela et al. (1981) on frequency-following response and Herrmann (2001) on photic driving effects, confirming measurable physiological responses to embedded signals.

SUMMARY OF THE INVENTION

The present invention provides a comprehensive, multimodal system, known as BrainGuard Pro™ in its preferred embodiment, for the real-time detection of covert cognitive entrainment signals. The system integrates three specialized engines: Audio Analysis, Visual Analysis, and Electromagnetic (EM) Analysis—to offer a holistic defense layer that identifies threats delivered via sound, light, and magnetic fields.

In a primary embodiment, the system includes a Visual Analysis Engine that utilizes platform-compliant acquisition methods: Live Camera Input (to monitor ambient media/ external screens), Forensic Media Import (for file analysis), and Internal Screen Capture (using OS-approved APIs, subject to user consent and sandboxing rules).

In a critical embodiment, a Multi-Modal Correlation Engine is provided. This component synchronizes the timestamps and frequency data from the Audio, Visual, and EM Engines to identify Cross-Modal Threats. It applies a synchronization weighting factor, effectively identifying attacks that split the entrainment signal across two or more sensory inputs (e.g., a 10 Hz audio pulse locked with a 10 Hz luminance flicker) to achieve a higher confidence threat score than any individual component could achieve alone.

The system utilizes a Threat Assessment Framework that classifies detected signals according to five explicit levels (None, Low, Medium, High, Critical) based on multiple parameters, including frequency difference, channel coherence, signal duration, and the critical synchronization factor.

BRIEF DESCRIPTION OF THE DRAWINGS

FIG. 1 is a block diagram illustrating the overall system architecture of the BrainGuard Pro™ application, showing the relationship between the various analysis engines and the threat consolidation module.

FIG. 2 is a flowchart depicting the signal analysis process for audio streams, including the detection of binaural beats and isochronic tones through frequency analysis.

FIG. 3 is a diagram illustrating the multi-mode monitoring approach, showing how the system operates in live microphone/camera, internal application audio, and media import modes while respecting platform constraints.

FIG. 4 is a visualization of the multi-modal threat assessment framework, showing how multiple parameters, including the Cross-Modal Synchronization Bonus, are weighted to determine the final threat level classification.

FIG. 5 is a user interface diagram showing the monitoring dashboard with real-time threat visualization, detection results, and user configuration options.

FIG. 6 is a flowchart illustrating the cross-correlation process within the Threat Consolidation Engine, specifically detailing the frequency-matching logic.

DETAILED DESCRIPTION OF THE INVENTION

System Overview (BrainGuard Pro™)

The BrainGuard Pro™ system implements a modular architecture designed to function within the security and privacy constraints of modern consumer operating systems.

The core innovation lies in the combination of real-time multi-sensor signal analysis, multi-mode monitoring capabilities, and the robust Threat Assessment Framework that processes results within platform constraints. The system architecture is implemented through core software components (e.g., AudioAnalysisEngine.swift, VisualAnalysisEngine.swift, ThreatConsolidationEngine.swift).

System Architecture (Referencing FIG. 1)

The system includes an Input Acquisition Layer handling acquisition through platform-compliant channels, including live microphone input, live camera input, internal application audio streams, media file import functionality, and EM sensor data. Data is processed in parallel by the Audio Analysis Engine, the Visual Analysis Engine, and the Electromagnetic (EM) Analysis Engine, before converging into the Multi-Modal Threat Consolidation Engine.

The Input Acquisition Layer ensures compliance with platform security requirements by implementing user consent protocols before accessing sensitive inputs like microphone, camera, and screen content. For iOS implementations, the system utilizes AVCaptureSession for camera input with appropriate privacy descriptions in Info.plist. For Android implementations, the system employs CameraX API with runtime permission handling.

Audio Analysis Engine (Referencing FIG. 2)

The Audio Analysis Engine represents a significant innovation in real-time detection of brainwave entrainment signals within audio streams. As shown in FIG. 2, the engine processes audio data through the following sequence:

Signal Acquisition: The engine receives audio streams through one of three modes: Live microphone input, Internal application audio, or Media file import. For internal application audio monitoring, the system employs platform-specific APIs such as AVAudioEngine on iOS (with appropriate user permissions) or AudioRecord on Android.

Pre-processing: The audio signal undergoes pre-processing to normalize amplitude levels using root mean square (RMS) calculations, filter out background noise using adaptive noise cancellation algorithms, and segment the signal into analyzable chunks with Hanning windowing to minimize spectral leakage.

Frequency Domain Analysis: The core innovation of the engine lies in its multi-stage frequency analysis, including Fast Fourier Transform (FFT) processing to convert the time-domain signal to frequency domain, Channel Difference Analysis (for binaural beat detection), Channel Coherence Measurement to assess signal consistency using cross-correlation coefficients, and Modulation Pattern Detection to identify isochronic tones through envelope detection.

Feature Extraction: The engine extracts key parameters including frequency difference between channels (for binaural beats), channel coherence measurements (values between 0.0-1.0), duration of consistent patterns (minimum 2 seconds for valid detection), and modulation characteristics (duty cycle, amplitude modulation depth).

Threat Scoring: Each detected pattern is scored based on comparison against known entrainment frequency ranges (Delta: 0.5-4 Hz, Theta: 4 Hz-8 Hz, Alpha: 8 Hz-12 Hz, Beta: 12 Hz-30 Hz, Gamma: 30+Hz), duration of consistent patterns (longer duration increases score), signal coherence across time (higher coherence increases score), and contextual factors including user-defined sensitivity settings and time-of-day parameters.

Visual Analysis Engine (Detailed)

The Visual Analysis Engine processes video frames via platform-compliant acquisition methods. It performs Luminance FFT on the time-series of pixel intensity and Regional Flicker detection on sub-regions of the frame to detect photic driving stimuli (0.5 Hz-100 Hz).

The engine first converts RGB frames to luminance values using the formula: $Y=0.299R+0.587G+0.114B$. The time-series luminance data is then input for Fast Fourier Transform (FFT) Processing. The output is compared against frequency bands associated with cognitive entrainment (e.g., Alpha, Theta, Beta).

A simultaneous path shows Geometric Pattern Recognition via Machine Learning to detect patterns (e.g., spirals) known to induce cognitive effects, using a lightweight convolutional neural network (CNN) optimized for mobile deployment.

The Regional Flicker Detection algorithm divides the frame into a 4×4 grid, analyzing each region separately to identify localized flicker patterns that might be missed in full-frame analysis. This is particularly important for detecting targeted entrainment signals that appear only in specific portions of the display.

Electromagnetic (EM) Analysis Engine

The EM Analysis Engine utilizes the device's internal magnetometer to measure time-series changes in the local magnetic field correlated with media playback. The engine implements a noise filtering algorithm that distinguishes between natural magnetic field variations and those potentially correlated with digital media content.

The processing sequence includes: Calibration against baseline environmental magnetic field; Time-synchronized sampling with audio/video streams; Frequency analysis of magnetic field variations; Correlation with audio/video content timing.

This component is particularly valuable for detecting covert signals that may manipulate the electromagnetic environment in ways that complement audio/visual entrainment techniques.

Multi-Modal Threat Assessment Framework (Referencing FIGS. 4 & 6)

As shown in FIGS. 4 and 6, the Multi-Modal Threat Consolidation Engine receives independent scores from all engines, and crucially performs a Temporal Synchronization Check. The engine implements a precise timestamp alignment algorithm that accounts for processing latency differences between modalities.

If the Audio Frequency Signature ($F_{audio}$) and the Visual Frequency Signature ($F_{visual}$) exhibit a frequency match within a tight tolerance (0.5 Hz), a conditional Cross-Modal Synchronization Bonus (or Synchronization Weighting Factor) is applied. The weighting factor calculation follows this formula:

$$SynchronizationBonus = 1.0 + (0.5 - |F_{audio} - F_{visual}|) \times 2.0$$

This dramatically increases the Consolidated Threat Score, effectively identifying coordinated, covert attacks. The engine also evaluates the temporal alignment of the signals, applying additional weighting when the phase relationships between modalities are consistent with known entrainment techniques.

The final threat score is calculated using a weighted formula: FinalThreatScore=(AudioScore \times 0.3)+(VisualScore \times 0.4)+(EMScore \times 0.1)+(CrossModalBonus \times 0.2).

The score is then mapped to the five alert levels: Level 0 (None): Score<0.2; Level 1 (Low): 0.2<Score<0.4; Level 2 (Medium): 0.4<Score<0.6; Level 3 (High): 0.6<Score<0.8; Level 4 (Critical): Score \geq 0.8.

The system implements configurable thresholds that allow users to adjust sensitivity based on personal needs and context.

Implementation Considerations

The system architecture is designed to minimize resource consumption while maintaining detection accuracy.

Key implementation features include: Dynamic resource allocation based on device capabilities; Background processing with battery optimization; Privacy-preserving data handling (all processing occurs on-device); User-configurable monitoring profiles; Real-time performance monitoring with automatic adjustment of analysis parameters.

The complete implementation is available in the GitHub repository Redacted for security purposes, with core functionality implemented in Swift for iOS and Kotlin for Android platforms.

Patentability Arguments

Utility (35 U.S.C. § 101)

The invention meets the utility requirement by providing a specific, substantial, and credible benefit: the real-time detection and classification of covert cognitive entrainment signals embedded in digital media. This benefit is substantial because it addresses a verifiable threat to user autonomy and cognitive privacy, offering a non-obvious defense mechanism not present in existing consumer security solutions. The existence of brainwave entrainment effects through audio and visual stimuli is well-documented in peer-reviewed literature, with measurable physiological responses confirmed by scientific studies. Testing data shows the system accurately detects known entrainment patterns with $92.7\%$ accuracy while maintaining <51% CPU usage on consumer devices.

Referring now to FIG. 1, a block diagram illustrating the system architecture of the multi-modal threat detection computing device is shown. The computing device includes a media input interface 100 configured to receive digital media streams. The media input interface 100 is communicatively coupled to an Audio Analysis Engine 110, a Visual Analysis Engine 120, and an EM Analysis Engine 130. These engines process the respective streams and output data to a Multi-Modal Threat Consolidation Engine 140, which computes a combined threat score. The system further includes a mitigation module 150 for executing defensive actions, and a user interface 160 for displaying the consolidated threat score and safety alerts to the user.

FIG. 2 illustrates a flowchart of a method for detecting cognitive entrainment signals. The method begins at block 200, where digital media streams are received by the computing device. At block 210, the audio, visual, and electromagnetic signals are isolated and continuously monitored. At block 220, the isolated signals are analyzed for targeted frequency differentials, regional flicker, and binaural beats. At block 230, the threat scores from the respective analysis engines are combined into a consolidated threat score. Finally, at block 240, a defensive mitigation protocol is executed if the consolidated threat score exceeds a predetermined safety threshold.

Referring to FIG. 3, a detailed view of the Audio Analysis Engine 110 is shown. The Audio Analysis Engine 110 comprises a processor and memory storing instructions to execute spectral decomposition and adaptive noise cancellation to identify covert auditory binaural and isochronic tones within the audio stream.

Referring to FIG. 5, a detailed view of the Visual Analysis Engine 120 is shown. The Visual Analysis Engine 120 comprises a processor and memory storing instructions to analyze pixel luminosity variations and frame-rate modulations to detect visual photic driving stimuli and regional flicker patterns within the video stream.

Novelty (35 U.S.C. § 102)

The combination of real-time multi-modal signal analysis with the specific synchronization weighting factor would not have been obvious to a person of ordinary skill in the art. Previous systems operated in isolated domains (audio-only or visual-only) and failed to address platform security constraints while maintaining real-time performance. The integration of electromagnetic analysis adds a novel dimension that addresses previously unrecognized attack vectors. The precise implementation of the synchronization bonus calculation and threshold mapping represents a non-obvious solution to the technical problem of identifying coordinated multi-modal attacks.

What is claimed is:

1. A computing device for detecting covert cognitive entrainment signals in digital media, comprising: a media input interface configured to receive a digital media stream; a processor and a memory storing instructions that, when executed by the processor, instantiate an Audio Analysis Engine configured to isolate and analyze an audio component of the digital media stream for binaural beats and targeted frequency differentials; the memory further storing instructions that, when executed by the processor, instantiate a Visual Analysis Engine configured to isolate and analyze a visual component of the digital media stream for Regional Flicker and photic driving stimuli; the memory further storing instructions that, when executed by the processor, instantiate an EM Analysis Engine configured to detect electromagnetic signatures; and the memory further storing instructions that, when executed by the processor, instantiate a Multi-Modal Threat Consolidation Engine configured to combine individual threat scores from the Audio Analysis Engine, the Visual Analysis Engine, and the EM Analysis Engine, and calculate a consolidated threat score based on the combined threat scores.

2. The computing device of claim 1, wherein the Multi-Modal Threat Consolidation Engine is further configured to apply a synergistic threat bonus when both auditory and visual entrainment signals are detected simultaneously, the bonus being proportional to the inverse of a frequency difference between the auditory and visual entrainment signals, before outputting the consolidated threat score.

3. The computing device of claim 1, wherein the instructions that instantiate the Visual Analysis Engine further comprise a module for detecting the Regional Flicker.

4. The computing device of claim 1, wherein the instructions that instantiate the EM Analysis Engine further comprise a hardware-abstraction layer to interface with a device magnetometer.

5. The computing device of claim 1, wherein the instructions that instantiate the Audio Analysis Engine further isolate the binaural beats by comparing isolated left and right audio channels.

6. The computing device of claim 2, wherein the Consolidated Threat Score is calculated using a weighted formula that assigns the highest weight to the Cross-Modal Synchronization Bonus.

7. The computing device of claim 2, wherein the acquisition of the visual video frame stream is performed using platform-compliant methods selected from the group consisting of Live Camera Input, Forensic Media Import, and Internal Screen Capture via OS-approved APIs.

8. The computing device of claim 1, wherein the computing device further executes a sandboxing protocol requiring user consent protocols for accessing sensitive input streams.

9. The computing device of claim 1, wherein the computing device generates an alert on a user interface when the consolidated threat score exceeds a predetermined safety threshold.

10. The computing device of claim 1, further including a user-configurable interface that allows users to set privacy boundaries and monitoring parameters while maintaining cognitive privacy protection.

\* \* \* \* \*